(12) United States Patent
Balachandran et al.

(10) Patent No.: US 7,304,971 B2
(45) Date of Patent: Dec. 4, 2007

(54) FLEXIBLE TRANSMISSION METHOD FOR WIRELESS COMMUNICATIONS

(75) Inventors: Krishna Balachandran, Morganville, NJ (US); Arnab Das, Old Bridge, NJ (US); Ashwin Sampath, Somerset, NJ (US); Hsuan-Jung Su, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1026 days.

(21) Appl. No.: 10/285,413

(22) Filed: Nov. 1, 2002

(65) Prior Publication Data

US 2004/0085934 A1 May 6, 2004

(51) Int. Cl.
*H04B 7/212* (2006.01)

(52) U.S. Cl. .................. 370/337; 370/442; 375/346; 714/748

(58) Field of Classification Search ............... 370/389, 370/230, 282, 337, 347, 442, 329, 336; 348/473; 455/450; 375/346; 714/748, 752
See application file for complete search history.

(56) References Cited

U.S. PATENT DOCUMENTS

| 6,144,653 | A | * | 11/2000 | Persson et al. ............. 370/337 |
| 6,914,637 | B1 | * | 7/2005 | Wolf et al. .................. 348/473 |
| 2003/0063606 | A1 | * | 4/2003 | Odenwalder et al. ....... 370/389 |

* cited by examiner

*Primary Examiner*—John Pezzlo (57) ABSTRACT

In the method, information from a user is transmitted over one or more communication channels of a wireless communication system by code multiplexing transmissions in the code domain. The method may include code multiplexing a first information from the user over a first channel with a second information from the user over a second channel, and determining a transmission format for the first and second channels. The transmission format may be determined based on one or more of available transmit power, transmission time interval, a coding dimension used for multiplexing, and transmit power used per code. The first information and second information are transmitted over the respective channels based on the determined transmission format.

19 Claims, 5 Drawing Sheets

FLEXIBLE TRANSMISSION METHOD FOR WIRELESS COMMUNICATIONS

CROSS REFERENCE TO RELATED CASES

The present invention is related to co-pending U.S. patent application Ser. No. 10/036,927 of Arnab DAS et al., entitled "AN ADAPTIVE HYBRID RETRANSMISSION METHOD FOR WIRELESS COMMUNICATIONS," filed on Oct. 19, 2001, the entire contents of which is incorporated by reference herein.

BACKGROUND OF THE INVENTION

1. Field of the Invention

The present invention generally relates to wireless communication systems, and more particularly to a method for transmitting information in such systems.

2. Description of Related Art

Wireless third generation (3G) communication systems are currently introducing technologies in order to become spectrally efficient, while supporting data services, and in order to provide improved multiplexing voice and multiplexing data services. These efforts have resulted in the development of the 3G1x-EVDV standard, an evolution of the CDMA2000 standard from the 3GPP2 body of standards. Similarly, the Universal Mobile Telecommunication System (UMTS) standard has introduced several advanced technologies as part of the High Speed Downlink Packet Access (HSDPA) specification. An aspect in all of these enabling technologies is to ensure that any associated control information is carried in an efficient manner.

Certain advanced or enabling technologies may include scheduling, Adaptive Modulation and Coding (AMC) and Hybrid Automatic Repeat Request (HARQ) technologies. These technologies have been introduced in an effort to improve overall system capacity. In general, a scheduler, such as is present at a base station (called Node-B in UMTS) selects a user for transmission at a given time, and adaptive modulation and coding allows selection of the appropriate transport format (modulation and coding) for the current channel conditions seen by the user. Accordingly, in scheduling, the Node B grants permission to one or more users at a time, rather than to allow data users to transmit autonomously. Typically, this is based on an estimate of each user's link quality in one of the downlink and uplink.

AMC technologies enable a selection of a data rate and a transmission format (i.e., modulation level and channel coding rate) that best "suits" the scheduled user's prevailing channel condition. Delays and measurement errors result in degraded performance from AMC. So, suppose a block of bits or a packet was sent out using QPSK modulation and a code rate of 0.5 and was received erroneously. A retransmission of that packet takes place, in general with a new appropriate choice of modulation and in general, at least a few new "parity" bits from the original set of coded bits.

HARQ allows combining of the original transmission with the new transmission, rather than to discard the original transmission. This greatly improves the probability of correct decoding of the packet. The word "hybrid" in HARQ indicates that Forward Error Correction (FEC) techniques have been used in addition to ARQ techniques. HARQ combining schemes imply that retransmissions are combined with the original unsuccessful transmissions. Accordingly, HARQ helps to ensure that transmissions resulting in unsuccessful decoding, by themselves, are not wasted. Lucent Technologies, Inc.'s Adaptive Asynchronous Incremental Redundancy ($A^2IR$) approach, which is a form of HARQ combining, has been adopted in both the 3G1x-EVDV and HSDPA specifications. $A^2IR$ is a flexible approach and allows HARQ combining of copies that use potentially different modulation schemes.

While much of the standardization to date has focused on the downlink (from base station (Node B)) to mobile station, similar enhancements are now being considered for the uplink. The enabling technologies discussed above are also available to enhance the uplink, but the relative importance of these technologies, and the specific methodology for each, may be quite different as related to the uplink. These differences may be due, for example, to different tradeoffs being applicable on the uplink, as compared to the downlink.

SUMMARY OF THE INVENTION

A flexible transmission approach for high speed wireless data systems, such as those based on one or more of the 3G1x-EVDV and UMTS standards, is described. In the method, information from a user is transmitted over one or more communication channels of a wireless communication system by code multiplexing transmissions in the code domain. The method may include code multiplexing a first information from the user over a first channel with a second information from the user over a second channel, and determining a transmission format for the first and second channels. The transmission format may be determined based on one or more of available transmit power, transmission time interval, a coding dimension used for multiplexing, and transmit power used per Walsh code. The first information and second information are then transmitted over the respective channels based on the determined transmission format.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

Although the following description is described as based on the well-known (HSDPA) specification in the UMTS standard, and will be described in this exemplary context, it should be noted that the embodiments shown and described herein are meant to be illustrative only and not limiting in any way. As such, various modifications will be apparent to those skilled in the art for application to other transmission systems and are contemplated by the teachings herein.

Where used below, base station and Node-B are synonymous. Additionally where used below, the terms user, user equipment (UE), mobile station and remote station are synonymous and describe a remote user of wireless resources in a wireless communication network. Further, in the context of the transmission method described hereafter, a fixed (e.g., fixed duration) transmission time interval (TTI) is indicative of information that is being transmitted in fixed length data frames, and a variable TTI is indicative of information that is being transmitted in variable length data frames, as is known. It should be noted that these terms, as used in the exemplary embodiment, are meant to be illustrative only and not limiting in any way. For example, the principles of the invention can be applied to other frame formats as a matter of design choice.

Moreover, although an exemplary embodiment of the invention, as to be described hereafter, refers to the use of coding dimensions, and in particular to using Walsh codes, as is known, to enable transmissions to be orthogonal to each other, the present invention is not so limited to the use of Walsh coding. For example, any mechanism or type of coding which enables transmissions to be orthogonal to each other may be applied in accordance with the principles of the invention.

The method in accordance with an embodiment of the invention uses a HARQ scheme based on a Stop-And-Wait (SAW) approach. Stop-And-Wait is a well-known Automatic Repeat Request (ARQ) protocol for data communications. For single-channel SAW ARQ, a transmitter sends a packet of data to the receiver and waits until it hears back an acknowledgement (ACK) or a negative acknowledgement (NACK) from the receiver. During the waiting period, the transmitter stops sending data to the receiver. If an ACK is received, the channel is clear to send new data. If a NACK is received, the transmitter will retransmit the originally sent data.

Single channel SAW ARQ may be quite inefficient since the channel is idle while the transmitter waits for an ACK or NACK from the receiver. To work around these inefficiencies, multi-channel SAW ARQ may be used, where the number of channels is determined based on the round-trip delay. For example, assuming each transmission uses T units of time and a round trip delay (excluding transmission time) is NT units of time, if N+1 SAW channels are defined, then, in principle, the channel may always be utilized. The operation may be as follows: transmitter sends data on SAW ARQ channel #1; if more data is present, transmitter transmits the new data on SAW ARQ channel #2 and so on. "Stop-and-Wait" operation takes place on each channel because nothing can be sent on each channel until an ACK/NACK is received from the receiver.

Hereafter, communication data channels may be referred to or described in terms of a HARQ SAW channel #1 and HARQ SAW channel #2. In general, for each transmission over each data channel (e.g., HARQ SAW channel), a separate control channel may be used to send the relevant control information to the receiver, such as a receiver of a base station, for example. In other words, a control channel may be used for transmitting control information associated with the data transmission in a data channel, according to well-known techniques. The control channels carry the Hybrid ARQ information and other control information, again according to well-known techniques.

The method is designed to provide a flexible transmission approach that may be used to maximize a user's data rate. Accordingly, an explanation of some differences between the downlink and uplink in a high speed wireless data communication system is provided in order to provide a context for the invention.

A downlink is a transmission from a base station to a UE. Downlink resources may include the total transmission power at the base station and the number of channelization codes (typically Walsh codes) available to the user. Each code may be thought of as providing a "channel" resource for transmission from the base station to a UE.

A typical mode of control operation in the downlink is power control for voice users, and rate control coupled with advanced technologies for data users. In other words, this means that the base station may dynamically adapt the transmitted power to each voice user (some fraction of the total power at its disposal) to ensure an adequate block error rate (BLER). For data users, the base station will use all the remaining power left over after serving voice users, and all remaining unused codes as well. The residual transmit power and codes are then used to transmit to one or more scheduled user(s), at data rates and with modulation/coding that is determined based on link quality feedback information that the base station has received from each UE in the recent past.

When more than one data user is scheduled in the downlink (e.g., simultaneous scheduling), the transmit power and codes are split up (e.g., shared amongst users) in some manner. The fact that more than one user is being scheduled simultaneously does not significantly alter the interference seen by each of the scheduled users, as compared to a case where only one user was scheduled. In other words, the sharing of transmit power and Walsh codes is permitted in the downlink and has no significant effect on interference between user and base station. Users transmitting simultaneously on the downlink are thus referred to as being "orthogonal" to each other.

An uplink is a transmission from one or more mobile stations to a base station. Unlike the downlink, where codes are typically shared, the entire set of Walsh codes is available for each user to use. Accordingly, in the uplink, a user cannot be distinguished based on which Walsh codes are being used. A mobile station is typically distinguished by its unique "pseudo-random" or equivalent binary sequences. Therefore, users transmitting simultaneously on the uplink are not orthogonal to each other, unlike the downlink, and simultaneous transmission may cause interference between users.

Uplink resources may include the mobile station's transmit power and the total received power at the base station. The total received power at the base station reflects the total transmit power of all users being served by the base station at that particular instant. The total received power at the base station is typically scaled by a measure of the thermal noise power at the base station receiver (called Rise over Thermal or RoT). A larger RoT value indicates higher "load" at the base station. In other words, for example, interference seen by uplink voice users, and at neighboring base stations, is higher for a higher value of RoT. Therefore, it is desirable to maximize the total uplink data rate from all users, subject to the RoT being below an allowable threshold.

In the uplink, users may generally be thought of as being in one of two modes: (a) in a scheduled transmission mode, and (b) in an autonomous transmission mode. Typically in a scheduled mode, a central entity such as the base station will decide if a mobile is scheduled to transmit at a particular instant or not. In (b), a user can "autonomously" decide when to transmit. In the autonomous mode, the central entity, i.e., Node-B, may decide to set some basic rules that should be adhered to by the users, such as rules related to transmission format (e.g., transport format) used to convey data to the base station receiver.

The method of the present invention is designed to exploit certain dimensions that may effect the transmission format used to transmit data. These dimensions, which may be exploited in the uplink so as to provide a flexible and efficient transmission scheme, may include user transmit power, transmission time interval, a Walsh coding dimension used for multiplexing in the code domain, and transmit power used per Walsh code.

In one aspect of the invention, transmit power is selected so as to use just enough mobile power for a selected data rate and transmission format, in an effort to "guarantee" that a certain receive quality target is met with high probability for a particular transmission. This target could vary for each retransmission. Hereafter, this target may be referred to as a "desired" amount of quality or energy. The peak allowed mobile station transmit power cannot be exceeded at any time. In another aspect, a Transmission Time Interval (TTI) may be selected so as to deliver the desired amount of energy per bit. Since energy is the product of power and time, both transmit power and TTI dimensions may be appropriately set, since the desired energy is known. In a further aspect, the number of Walsh codes simultaneously being used by a single user may be manipulated. For a given spreading factor (SF) and modulation, the number of coded bits (and effectively the code rate) may be selected based on the number of simultaneous codes.

For example, and for a given transmission, assume a spreading factor SF=4 (indicating that up to 4 Walsh codes may be available for use) is to be used along with QPSK modulation (2 bits/modulation symbol). Furthermore, suppose that the transmission is to take place over 2 ms (e.g., the transmission time interval (TTI)), or over three (3) timeslots in UMTS (each slot is 0.667 ms in UMTS, as is known). For the chip-rate used in UMTS (chip rate=3.84 Mc/s in UMTS), this corresponds to a total of 7680 chips per code that will be used for that transmission. Dividing 7680 by SF arrives at a total of 1920 modulation symbols that can be sent per SF=4 code. This is equivalent to sending 3840 coded bits, per code, per 2 ms TTI.

Further in this example, assume that the number of data bits to be transmitted is 3072. Thus, a transmission using one SF=4 code results in a coding rate of 3072/3840=0.8, a transmission using two (2) of the SF=4 codes results in a coding rate of 0.4 and so on. Thus, in this aspect, the Walsh code dimension may be exploited in order to appropriately determine or select the transmission format to be used for transmission.

Unlike in the downlink, where codes are shared amongst many users, in the uplink each user has a full set of Walsh codes to itself. Therefore, for a fixed amount of user transmit power, it is not efficient for the user to use only two (2) of the SF=4 codes, rather than all available SF=4 codes for an uplink data transmission. It should be understood that "available" may mean that only a subset of all possible available Walsh codes may be used for data transmission. In the example using SF=4, perhaps one of the four Walsh codes has been used up for voice transmission; thus only three Walsh codes remain available for use. In yet a further aspect of the invention, if the Walsh code dimension may be exploited as above to determine a transmission format, then, additionally, the power per Walsh code may also be appropriately set to maximize a user's uplink data rate. In other words the method in accordance with the invention also envisions controlling division of the user's transmit power across all Walsh code.

The method in accordance with the invention has been developed with an intent of meeting the following goals. Firstly, and as far as is possible, only one (1) user at a time should be scheduled on the uplink. Scheduling more than one user on the uplink simultaneously is inefficient, as they interfere with each other. Secondly, and within the bound of each scheduled user's maximum allowed transmit power, the transmission power and data rate of the scheduled user should be selected so as to "fill up" what is left of the RoT, but not so much that the RoT exceeds the acceptable threshold. For a fixed channel gain, the higher the user's transmit power, the higher the RoT.

Finally, at least one or a combination of the above dimensions should be selected so that a desired amount of energy per information bit is delivered to the receiver (e.g., base station receiver). In doing so, information about energy already present from a previously unsuccessful transmission may be used, along with Hybrid ARQ. For example, assume that the desired receive energy-per-bit to total interference+ noise density ratio (SINR) target for a packet of 3072 bits is "A." Furthermore, assume that "X" amount of A was delivered in a previous unsuccessful transmission. Roughly speaking, a retransmission can now target (A−X) and select transmission formats for delivering (A−X). Upon HARQ combining of the two transmissions (A−X+X), the resultant value will be A, as desired.

Depending on a particular situation, the following may be are observed in accordance with an exemplary embodiment of the invention:

(a) a fixed TTI may be assumed. In some cases, a fixed TTI may be desirable for operational simplicity. However, the present invention is not limited to a fixed TTI, as the method may be used in conjunction with exploiting the time domain via a variable TTI approach;

(b) a scheduled or autonomous user may have a data packet pending recovery on HARQ SAW channel #1. In other word, one or more previous transmissions of that data packet may have resulted in errors;

(c) very little additional energy may need to be transmitted for the packet in (b) to succeed; and (d) the entire allowed power (based on RoT and a user maximum transmit power consideration) transmitted over the TTI may be much more than the required energy; or (e) if all Walsh codes are used by the user, the resultant code rate (number of coded bits to number of information bits) may be much lower than is necessary.

Based on the above, the user may consider transmission options to (i) lower its transmit power appropriately, and/or (ii) use fewer than the total Walsh codes available at its disposal to send fewer coded bits (i.e., use the required code rate but not smaller). Neither of these options is efficient. If the mobile station uses less than the allowed transmit power, then the RoT will not be "filled up" to the threshold, implying an underutilization of uplink capacity. Similarly, using a subset of the coded bits allowed is also not efficient because the left over codes are wasted (since on the uplink, codes are resource per user, not resource-shared).

A third option, scheduling some other user simultaneously to "fill up" the uplink capacity, is inefficient, since on the uplink, the users will interfere with each other. Accordingly, multiplexing more than one user simultaneously on the uplink must be thought of as a last resort. Accordingly, an efficient solution based on the above is now described with respect to the following three cases.

Case I Solution

If data is pending recovery on more than one HARQ SAW channel from a single user, then one solution may be to transmit as many of the transmissions as possible. For example, HARQ SAW channel #1 may have 3000 bits pending recovery, while HARQ SAW channel #2 may have 1000 bits pending recovery. If neither channel has sufficient data thereon to single handedly "fill up" the uplink capacity, then an attempt should be made to send data from both channels by multiplexing the data in the code domain. Thus, in this example, and assuming four (4) Walsh codes are available (SF=4) to a user, a transmission format may be configured where HARQ SAW channel #1 may be transmitted using Walsh code numbers 1-3, and HARQ SAW channel #2 can then use Walsh code 4.

Case II Solution

If only one HARQ SAW channel has data pending recovery, but there is new (previously unsent) data in the user's buffer that is to be sent over a second HARQ SAW channel, then a multiplexing in codes similar to described in can be done. For example, HARQ SAW channel #1 may have 3000 bits pending recovery, while HARQ SAW channel #2 may be used to send an initial transmission of 800 bits. Accordingly a transmission format may be configured where Walsh codes 1-3 may be used by HARQ SAW channel #1 for retransmission of the 3000 bits, while HARQ SAW channel #2 may use Walsh code 4 to send the initial transmission of 800 bits. In each of Case I and Case II, permitting multiplexing of HARQ channels in the code domain from the same (single) user is appropriate to do, because the code multiplexing of data on the multiple channels attempts to "fill up" the uplink capacity with only a single, scheduled user transmitting at one time. Hence, a user may maximize use of its available capacity in the uplink.

Case III Solution

If only one HARQ SAW channel has data pending recovery, but there is new (previously unsent) data in the user's buffer that is to be sent over a second HARQ SAW channel, then multiplexing both in the code domain and time domain over a TTI is also possible. For example, HARQ SAW channel #1 may have 3000 bits pending recovery, HARQ SAW channel #2 have 1200 bits pending recovery and a HARQ SAW channel #3 may be used to send an initial (unsent) transmission of 1500 bits. Accordingly, a transmission format may be configured where Walsh codes 1-4 may be used by HARQ SAW channel #1 for retransmission of the 3000 bits, HARQ SAW channel #2 may use Walsh codes 1 and 2 for retransmission of 1200 bits, and HARQ SAW channel #3 may use Walsh codes 3 and 4 for the initial (unsent) transmission of 1500 bits. Here, the code and time multiplexing of data on the multiple channels attempts to "fill up" the uplink capacity with only a single, scheduled user transmitting at one time. This allows a user to maximize use of its available capacity in the uplink.

Additional fine control may be used in determining the transmission format, such as by controlling a division of the total mobile transmit power across all Walsh codes. For example the transmission format may be configured so that codes 1-3 may use only 30% of the total transmit power, while code 4 is allocated the remaining 70% of the total power, even though channel #1, in using codes 1-3, represents use of 75% of the available codes, while channel #2 uses only 25% of the available codes. Nevertheless this type of flexibility is very useful for adaptive Hybrid ARQ operation, because a desired receive quality target may be achieved in an efficient manner, without wasting resources, such as residual transmit power or codes, in the uplink.

Figure 1:
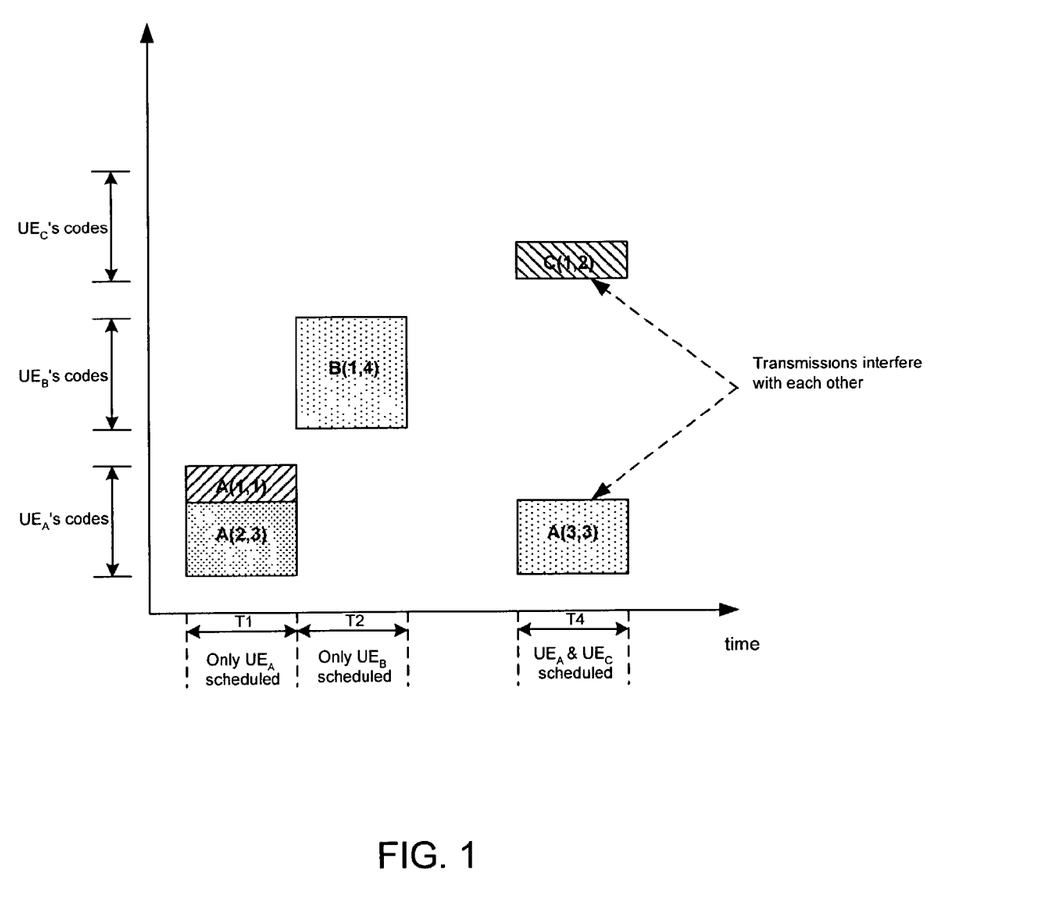
FIG. 1 illustrates an exemplary embodiment of the invention in the context of wireless data transmission in third generation (3G) systems with respect to scheduled transmissions.

FIG. 1 illustrates an exemplary embodiment of the invention in the context of wireless data transmission in third generation (3G) systems with respect to scheduled transmissions. Referring to FIG. 1, the x-axis denotes time and more particularly, fixed TTIs for a plurality of users, $UE_A$, $UE_B$ and $UE_C$. On the y-axis is indicated the Walsh codes available to each user. If the entire span of the available codes on the y-axis are filled, then the user is efficiently using the available uplink capacity, e.g., "filling-up" the uplink capacity. The X(i, j) notation denotes that a user X is transmitting on HARQ SAW channel i, using j codes. Each user has its own set of Walsh codes. In other words, the codes are not a shared resource, as in the downlink.

In FIG. 1, and at T1, $UE_A$ is able to use all the available uplink capacity because this user has data available on two channels, channels #1 and 2 that it may multiplex in the code domain in order to "fill-up" the available uplink capacity and hence, efficiently use its available resources. If both channels have sufficient data thereon to single handedly "fill up" the uplink capacity, then an attempt should be made to send data from both channels by multiplexing the data in the code domain. Thus, in this example, and assuming four (4) Walsh codes are available (SF=4) to each user, a transmission format may be configured where data on channel #1 may be transmitted using Walsh code number 1, and data on channel #2 can be transmitted using Walsh codes 1-3. This is similar to the Case 1 solution described above.

In T2, $UE_B$ is efficient because it just so happens that $UE_B$ has sufficient data on channel #1 and may use all four available Walsh codes in order to fill-up the available uplink capacity. However, a user may not have enough data available to fill the uplink capacity. Although it is desirable to schedule users one at a time, there may be situations where no single user may be able to single-handedly fill up the available uplink capacity. In this case, simultaneously transmissions over the uplink may be used, as indicated in T4. In FIG. 1, neither $UE_A$ nor $UE_C$ have sufficient data on their respective channels in T4 to single-handedly fill up the available uplink capacity. Accordingly, data from channel of these two different users are multiplexed in the code domain; however, the multiple transmissions from different UEs will interfere and degrade each user's throughput.

Figure 2:
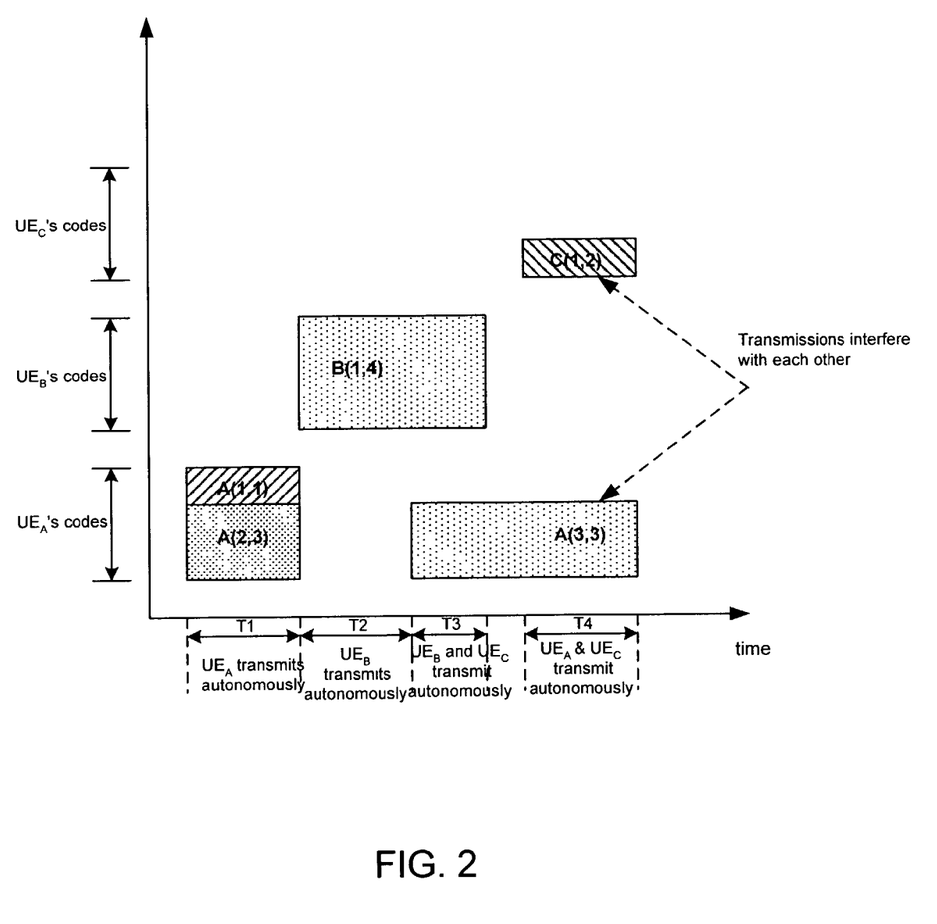
FIG. 2 illustrates an exemplary embodiment of the invention in the context of wireless data transmission in third generation (3G) systems with respect to autonomous transmissions.

FIG. 2 illustrates an exemplary embodiment of the invention in the context of wireless data transmission in third generation (3G) systems with respect to autonomous transmissions. In an autonomous mode, a user may "autonomously" decide when to transmit, e.g., it is not scheduled by the base station, but may be subject to certain rules related to the transmission format (e.g., transport format) used to convey data to the base station receiver. FIG. 2 is similar to FIG. 1, but shows a plurality of users transmitting autonomously using the principles of the invention. In FIG. 2, $UE_A$ and $UE_B$ are transmitting autonomously (and simultaneously) in T3, and $UE_A$ and $UE_C$ transmitting autonomously in T4. As Walsh codes are not shared, there may be some degradation in T3 and T4,; however, $UE_B$ is more efficient in using its available uplink capacity in both T2 and T3 then is $UE_A$ (in T3 and T4) and $UE_C$ in T4.

Figure 3:
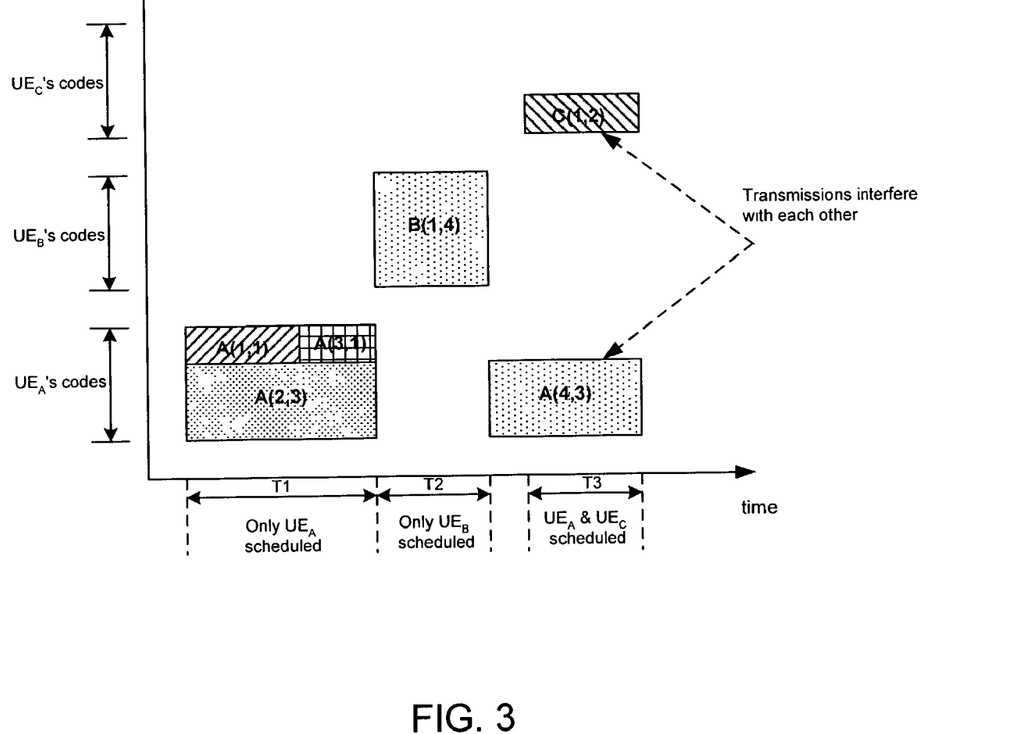
FIG. 3 illustrates an exemplary embodiment where transmissions occur over a variable transmission time interval (TTI)

FIG. 3 illustrates an exemplary embodiment where transmissions occur over a variable transmission time interval (TTI). The method is applicable even for variable TTI operation (i.e., when the time dimension is being exploited in addition to the code and/or power dimension). For example, if the smallest allowed TTI is 1 timeslot or 0.667 ms (in UMTS) and, even in this case, the energy delivered is excessive, then the scheduled user may choose to multiplex more than one HARQ SAW channel in the code domain, in the manner described above.

Figure 4:
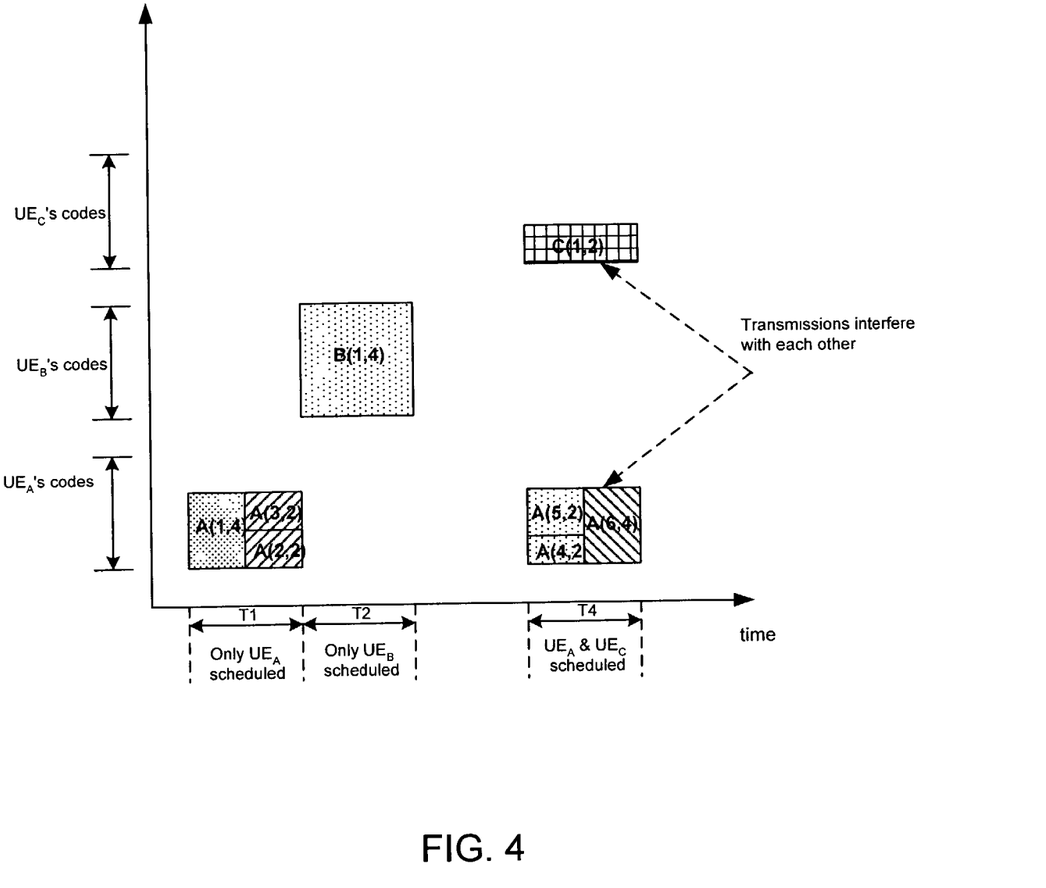
FIG. 4 illustrates an exemplary embodiment of the invention in the context of wireless data transmission in third generation (3G) systems using time multiplexing techniques.

Referring to FIG. 3, this is illustrated with respect to $UE_A$. As with the above figures, each user has its own set of codes, but here the duration of each TTI is no longer fixed, but varies for each user. Here $UE_A$ has multiplexed data from multiple data channels (HARQ SAW channels) in an effort to fill-up the available capacity in the uplink. Particularly, Walsh codes 1-3 may be used by data channel #2 for transmission/retransmission of the data thereon; Walsh code 1 may be used by data channel #1 in a first part (timeslot) of T1, and then by a data channel #3 in a second part (timeslot) of T1 for $UE_A$. As with the above cases, it is desirable to schedule one user at a time for transmission, but this might not always be possible in environments having a high density of users. Accordingly, for simultaneous transmissions in the uplink, there may be some interference between channels, as shown in transmission time interval T3 where transmission between channels FIG. 4 illustrates an exemplary embodiment of the invention in the context of wireless data transmission in third generation (3G) systems using time and code multiplexing techniques. Referring to FIG. 4, and at T1 (here shown as a fixed transmission time interval (TTI), such as 2.0 msec in UMTS, for example), $UE_A$ is able to use all the available uplink capacity because this user has data available on three (3) channels. As shown in FIG. 4, within T1, Channel #1 is multiplexed with Channel #2 and Channel #3, in the time domain, in adjacent timeslots within T1. Additionally, multiplexing of channels #2 and #3 are carried out in the code domain, so as to "fill-up" the available uplink capacity and hence, efficiently use all available resources.

Thus, in this example, and assuming four (4) Walsh codes are available (SF=4) to a user, a transmission format may be configured where data on channel #1 may be transmitted using Walsh codes 1-4 over the first half of the TTI, data on channel #2 can be transmitted using Walsh codes 1-2 over the second half of the TTI and data on channel #2 can be transmitted using Walsh codes 3 and 4 over the second half of the TTI. This is similar to the Case III solution described above.

Signaling

Allowing this flexibility entails some additional signaling in the uplink and downlink. On the uplink, transmission formats for all multiplexed HARQ transmissions may need to be signaled. On the downlink, the capability of multiplexing more than one acknowledgment (ACK) or negative acknowledgement (NACK) may be necessary.

In the co-pending and cross-referenced U.S. patent application to Das et al., we proposed allowing multiple simultaneous transmissions to a UE in the downlink. Here, we also make use of multiple simultaneous transmissions from a UE to the Node-B in the uplink, in order to fully exploit uplink capacity. In general, for each transmission, a separate control channel is used to send the relevant control information to the receiver. For example, in HSDPA, control parameters for each transmission to a UE, such as modulation and coding, data rate, HARQ channel information, etc., are transmitted on a separate channel called a High Speed Shared Control Channel (HS-SCCH). While the exact structure for corresponding transmissions on the uplink have yet to be defined, it is expected that a similar control channel (which may well contain a different set of parameters) may be used for each uplink transmission from a UE. Therefore, whenever simultaneous transmissions are made to a receiver within a frame, multiple control channels may be used for the same user, as illustrated in FIG. 2 of the co-pending Das et al. application, for example Furthermore in this case, multiple simultaneous acknowledgement/negative acknowledgements (ACK/NACKs) may also be sent to the transmitter, separately for all the transmissions within a frame. In Das et al., a scheme is proposed wherein, when a simultaneous transmission and retransmission is received in the same frame, the receiver changes the format of the typical ACK/NACK message to a multi-level ACK/NACK, and sends it out using one channelization code.

In accordance with the exemplary embodiment of the present invention, we describe another method for the receiver to send multiple simultaneous ACK/NACKs to the transmitter. Particularly, multiple channelization codes may be used for sending the multiple ACK/NACKs. Thus, multi-level ACK/NACKs are no longer necessary in this approach.

For example, if two transmissions are made within a frame, then two ACK/NACKs are sent by the receiver on two separate channelization codes, each channelization code carrying an ACK/NACK for a particular transmission. Each such channelization code used for transmitting an ACK/NACK may be referred to as an ACK/NACK channel.

In order to ensure robustness for this approach, in the exemplary embodiment, as many ACK/NACK channels are defined as there are control channels. For example, in HSDPA, if N HS-SCCH channels are used to send control information for transmissions destined to one or more users, then each receiver has N ACK/NACK channels. For convenience, these control channels are indexed from 1 to N. The receiver (e.g., at the base station for uplink) now sends the ACK/NACK on the i-th ACK/NACK channel if the control information for a particular transmission is received on the i-th control channel. In the case when, for example, two simultaneous transmissions are made within a frame, and the corresponding control information is received on the i-th and j-th control channels, the ACK/NACKs are sent on the i-th and j-the ACK/NACK channels.

In an effort to achieve additional robustness to channel noise when transmitting multiple ACK/NACKs, multi-level ACK/NACKs may still be used in the exemplary embodiment. However, these multi-level ACK/NACKs are sent out over multiple ACK/NACK channels (rather than over a single ACK/NACK channel). The ACK/NACK channels that are to be used may be determined by the index of the control channel on which the control information, corresponding to each transmission, is received.

Further, multiple ACK/NACKs may be sent by the receiver over one or more ACK/NACK channels; however, as opposed to the solutions proposed above, these ACK/NACKs are not sent simultaneously, but are staggered in time/frames. The exact timing for each ACK/NACK, and/or the ACK/NACK channel used to send it, may be pre-determined.

Figure 5:
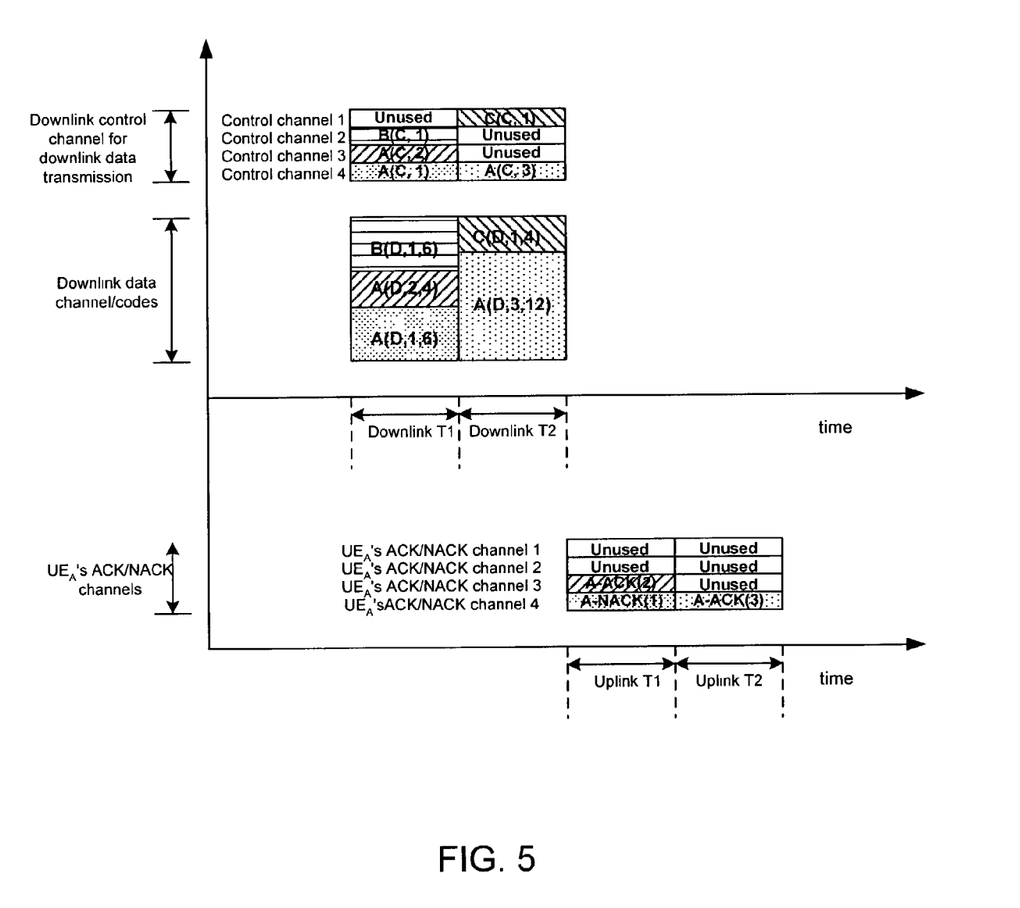
FIG. 5 is illustrative of acknowledgments and negative acknowledgments in accordance with an exemplary embodiment of the invention.

FIG. 5 is illustrative of acknowledgments and negative acknowledgments in accordance with an exemplary embodiment of the invention. FIG. 5 is provided to illustrate the basic signaling principles in accordance with the invention.

Referring now to FIG. 5, The X(C, i) notation indicates downlink control information transmission for user X for HARQ channel i, and the X(D, i, j) notation indicates downlink data transmission to user X on HARQ channel i, using j codes. As shown in FIG. 5, data transmissions from two users, $UE_A$ and $UE_B$ and associated control channels, respectively, are transmitted within a fixed TTI, hence within a fixed length frame. For example, and in the downlink, control channel 3, A(C,2) is transmitted with downlink data channel A(D, 2, 4), within a fixed length frame (e.g., within Downlink T1), control channel 1, C(C, 1) is transmitted with corresponding downlink data channel C(D, 1, 4) in. Downlink T2, etc. As shown in FIG. 5, four control channels may be used in T1, but since there are only three transmission in T1, one control channel remains unused.

FIG. 5 also illustrates how each control channel in the downlink has a corresponding ACK/NACK channel in the uplink, delayed in time. The X-ACK(i) notation indicates an ACK transmitted by user X for downlink data transmission on HARQ channel i; and the X-NACK(i) notation indicates a NACK transmitted by user X for downlink data transmission on HARQ channel i.

Accordingly, and although codes are a shared resource in downlink transmissions, for ACK/NACK transmissions by users, each-user has a complete set of codes; hence these codes are not a shared resource. The ACK/NACKs are transmitted by each user some time after the corresponding downlink data transmissions are received. This is due to delay each user experiences for processing the downlink transmissions. As shown in FIG. 5 for $UE_4$, the number of available ACK/NACK channels may equal the number of control channels available for a user. In FIG. 5, $UE_4$ has four ACK/NACK channels, to match the number of available control channels (4). Here, and referring to Uplink T1 (TTI), $UE_4$'s ACK/NACK channels 3 and 4 correspond to the control information on control channels 3 and 4.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method for transmitting information from a user over one or more communication channels of a wireless communication system, comprising:
   code multiplexing a first information from the user over a first channel with a second information from the user over a second channel,
   determining a transmission format for the first and second channels based on at least one or more of user transmit power, transmission time interval, a coding dimension and transmit power used per code, and
   transmitting the first information and second information over the first and second channels in accordance with the determined transmission format, wherein
   the first information is a retransmission of a previous data transmission from the user that had resulted in a transmission error, and
   the second information is a new transmission of data previously unsent.

2. The method of claim 1, wherein said determining step further includes determining a transmission format for the first and second channels by allocating a number of Walsh codes to each of the first information and second information, said allocating based on channel conditions.

3. A method for transmitting information from a user over one or more communication channels of a wireless communication system, comprising:
   code multiplexing a first information from the user over a first channel with a second information from the user over a second channel,
   determining a transmission format for the first and second channels based on at least one or more of user transmit power, transmission time interval, a coding dimension and transmit power used per code, and
   transmitting the first information and second information over the first and second channels in accordance with the determined transmission format,
   wherein the first information and second information are retransmissions of previous data transmissions from the user that had resulted in transmission errors, and
   said determining step further includes determining a transmission format for the first and second channels by allocating a number of Walsh codes to each of the first information and second information, said allocating based on channel conditions, and
   the number of Walsh codes used for the first information is equal to the number of Walsh codes used for the second information.

4. A method for transmitting information from a user over one or more communication channels of a wireless communication system, comprising:
   code multiplexing a first information from the user over a first channel with a second information from the user over a second channel,
   determining a transmission format for the first and second channels based on at least one or more of user transmit power, transmission time interval, a coding dimension and transmit power used per code, and
   transmitting the first information and second information over the first and second channels in accordance with the determined transmission format, wherein
   the first information and second information are retransmissions of previous data transmissions from the user that had resulted in transmission errors, and
   said determining step further includes determining a transmission format for the first and second channels by allocating a number of Walsh codes to each of the first information and second information, said allocating based on channel conditions, and
   said channel conditions include one or more of a data size of a transmission to be sent over the first or second channels, a current channel quality, a desired received quality target and, if the first or second information is a retransmission, a channel quality of the first or second channel at the time of the previous transmission.

5. The method according to claim 2, wherein a number of Walsh codes used for the first information is different than the number of Walsh codes used for the second information.

6. The method according to claim 2, wherein a number of Walsh codes used for the first information is equal to the number of Walsh codes used for the second information.

7. The method according to claim 2, wherein said channel conditions include one or more of a data size of a transmission to be sent over one of the first or second channels, a current channel quality, a desired received quality target and, if the first or second information is a retransmission, a channel quality of the first or second channel at the time of the previous transmission.

8. A method for transmitting information from a user over one or more communication channels of a wireless communication system, comprising:
   code multiplexing a first information from the user over a first channel with a second information from the user over a second channel,
   determining a transmission format for the first and second channels based on at least one or more of user transmit power, transmission time interval, a coding dimension and transmit power used per code, and transmitting the first information and second information over the first and second channels in accordance with the determined transmission format, wherein the first and second channels are data communication channels.

9. The method according to claim 8, wherein said data channels are Hybrid Automatic Repeat Request (HARQ) channels using a stop and wait (SAW) protocol.

10. The method according to claim 9, wherein said adjusting step further includes selecting a transmit power for the first and second channels so that a rise over thermal (RoT) value at a receiver receiving transmissions of said first information and said second information does not exceed a threshold.

11. A method for transmitting information from a user over one or more communication channels of a wireless communication system, comprising:

code multiplexing a first information from the user over a first channel with a second information from the user over a second channel, determining a transmission format for the first and second channels based on at least one or more of user transmit power, transmission time interval, a coding dimension and transmit power used per code, said determining step further including determining a transmission format for the first and second channels based on one of a fixed transmission time interval and a variable transmission time interval, and transmitting the first information and second information over the first and second channels in accordance with the determined transmission format.

12. A method for transmitting information from a user over one or more communication channels of a wireless communication system, comprising:

code multiplexing a first information from the user over a first channel with a second information from the user over a second channel, determining a transmission format for the first and second channels based on at least one or more of user transmit power, transmission time interval, a coding dimension and transmit power used per code, and transmitting the first information and second information over the first and second channels in accordance with the determined transmission format, and time multiplexing a third information from the user over a third channel with one or more of said first information on said first channel and said second information on said second channel.

13. The method of claim 8, further comprising:

time multiplexing information on one of a plurality of channels with information on other channels of said plurality of channels, wherein some of the channels being subject to multiplexing in the time domain are also subject to said code multiplexing.

14. A method by which a user employing the method of claim 8 signals receipt of received transmissions, comprising:

for N transmissions received, sending N signaling messages over separate channelization codes, each channelization code carrying a signaling message for a particular received transmission.

15. The method of claim 14, wherein said sending further includes, for each received transmission, sending one of an acknowledgement (ACK) and a negative acknowledgment (NACK) to the received transmission over a channelization code.

16. The method of claim 15, wherein said sending further includes sending multiple ACKs/NACKs over multiple channelization codes.

17. The method of claim 15, wherein each channelization code is represented by an ACK/NACK channel.

18. The method of claim 17, wherein the number of ACK/NACK channels equals a number of control channels used for sending said N transmissions.

19. The method of claim 8, wherein the number of channels equals the number of transmissions that are to be transmitted over the channels.

* * * * *